United States Patent Office 2,956,985
Patented Oct. 18, 1960

2,956,985

METAL SALTS OF DITHIOCARBAMIC ACIDS AS CATALYSTS IN THE PRODUCTION OF POLYESTERS

Jack G. Scruggs and William A. H. Huffman, Decatur, Ala., assignors to The Chemstrand Corporation, Decatur, Ala., a corporation of Delaware No Drawing. Filed Nov. 18, 1957, Ser. No. 696,932

11 Claims. (Cl. 260—75)

This invention relates to an improved method for preparing high molecular weight polyesters, such as those obtained by condensation reactions of polyhydric alcohols and dibasic acids or reactive derivatives thereof, in the presence of a catalyst. More particularly the invention relates to use of metal salts of dithiocarbamic acids as catalysts in the preparation of fiber-forming polyesters.

Polymeric polyesters are prepared by heating together dihydric alcohols or functional derivatives thereof and dicarboxylic acids or polyester forming derivatives thereof. Highly polymerized polyesters can be formed into filaments, fibers, films and the like which can be permanently oriented. The most widely known and most important commercially of the polymeric polyesters is polyethylene terephthalate which normally is prepared by an ester interchange reaction of dimethyl terephthalate with ethylene glycol to form bis-betahydroxyethyl terephthalate, and subsequent polymerization of the bis-betahydroxyethyl terephthalate under reduced pressure and at elevated temperatures.

Some difficulties have been encountered in large scale production of polyethylene terephthalate by this sequence of reactions. Highly purified dimethyl terephthalate and ethylene glcyol react so slowly as to be a real disadvantage in large scale commercial operations. In an effort to increase the reaction rate of dimethyl terephthalate with ethylene glycol and subsequent polymerization of the resulting bis-betahydroxyethyl terephthalate, catalysts have been employed to accelerate the reactions. Many catalysts have been proposed for these polyesterification reactions, none of which have been found to be completely satisfactory. The most serious deficiencies of nearly all of the proposed catalysts are their insolubility in the polymerization mixtures and their inducement of the formation of discolored products. The polymerization reaction, which is conducted at high temperatures, often must be so prolonged, in order to obtain the desired degree of polymerization for polyesters having fiber-forming characteristics, that the polymers often become degraded and develop color which obviously is undesirable in fiber-forming polyesters. Some of the catalysts proposed for use in these reactions have resulted in improvement in reaction rate but have not completely eliminated color formation in the polyester product.

It is an object of this invention to provide an improved process employing novel catalysts which accelerate the ester interchange reaction between glycols and esters of dicarboxylic acid. It is another object of this invention to provide an improved process and catalysts that accelerate the polymerization of reactive intermediates obtained from glycols and esters of dicarboxylic acids into high molecular weight polyesters. It is still another object of this invention to provide a new and improved process for producing polyethylene terephthalate through the use of novel catalysts that accelerate the polyester forming reactions. It is a further object of this invention to provide a catalyzed process for preparing polymeric polyesters which have improved color. Other objects and advantages of this invention will be apparent from the description which follows.

The objects of this invention are accomplished by conducting either or both the ester interchange reaction between glycols and esters of dicarboxylic acids, and subsequent polymerization of the resulting reactive intermediate, in the presence of catalytic amounts of metal salts of dithiocarbamic acids. The metal salts of dithiocarbamic acids are excellent catalysts for polyester formation and act either as color inhibitors or as agents that do not cause color formation in the polymer products. In addition, these catalysts are readily available on the market. Polyesters prepared by the process of this invention are readily and rapidly formed, are substantially free of color and have high molecular weights. The catalysts of this invention are particularly valuable as second stage or polymerization catalysts.

In the preparation of polymeric polyesters by means of an ester interchange reaction, the method comprises two steps. In the first stage a glycol such as ethylene glycol and an ester of a dicarboxylic acid such as dimethyl terephthalate are reacted at elevated temperatures to form a reactive intermediate such as bis-2-hydroxyethyl terephthalate and methanol which is normally removed by distillation. Thereafter in the second or polymerization stage the ester interchange reactive intermediate such as bis-2-hydroxyethyl terephthalate is heated at still higher temperatures and under reduced pressure to form a polyester such as polyethylene terephthalate with the elimination of glycol which is readily removed from the system during the polymerization reaction. The second or polymerization step is continued, if a fiber-forming polymer is desired, until the reaction product has the desired degree of polymerization, which may be determined by viscosity measurements. Without the use of catalysts, the above reactions proceed at negligible rates even at high temperatures.

Of course, as will be recognized by those skilled in the art, the reactive intermediate which is polymerized to give a fiber-forming polymer may be prepared by other ways than ester interchange. For example, bis-betahydroxyethyl terephthalate may be prepared by the reaction of ethylene carbonate with terephthalic acid, the reaction of terephthaloyl chloride with ethylene glycol, by the reaction of ethylene oxide with terephthalic acid, by the reaction of terephthalic acid with ethylene glycol and the like. Usually, however, this intermediate is obtained from dialkyl esters of dicarboxylic acids and glycols as described. Regardless of how the reactive intermediate is obtained, the polymerization reaction to form polymeric polyesters is effectively accelerated by conducting this reaction in the presence of catalytic amounts of metal salts of dithiocarbamic acids, and the resulting high molecular weight fiber-forming polymeric polyesters are obtained in a substantially color free state.

This invention contemplates conducting both steps of the polyester reaction, either separately or consecutively, in the presence of catalytic amounts of metal salts of dithiocarbamic acids. Those catalysts found useful in this invention are metal salts of dithiocarbamic acids, and particularly metal salts of monoalkyl dithiocarbamates and dialkyl dithiocarbamates wherein the alkyl groups contain 1 to 10 or more carbon atoms, more preferably 1 to 5 carbon atoms. The metal salts of the dithiocarbamic acids may be salts of the alkali metals such as lithium, sodium and potassium; salts of alkaline earth metals such as magnesium, calcium, strontium, barium, zinc, cadmium and mercury; and other metal salts including such metals as aluminum, tin, antimony, cerium, titanium, zirconium, cobalt, germanium, lead, manganese and the like. A preferred group of metal salts are salts of lithium, zinc, and manganese. Representative catalysts found useful in the practice of this invention include zinc diethyl dithiocarbamate, lithium diethyl dithiocarbamate, manganese diethyl dithiocarbamate, sodium diethyl dithiocarbamate, potassium dimethyl dithiocarbamate, zinc dimethyl dithiocarbamate, manganese dimethyl dithiocarbamate, lithium dimethyl dithiocarbamate, manganese diisoamyl dithiocarbamate, manganese dihexyl dithiocarbamate, sodium and zinc salts of a bis-dithiocarbamic acid such as ethylene-bis-dithiocarbamic acid

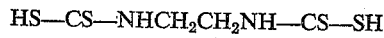

manganese dithiocarbamate, manganese ethyl dithiocarbamate, zinc dibenzyl dithiocarbamate, zinc N-ethyl-N-phenyl dithiocarbamate, manganese dibenzyl dithiocarbamate, manganese N-ethyl-N-phenyl dithiocarbamate and the like. These catalysts may be represented by the general formula

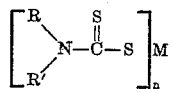

wherein R and R' are hydrogen, alkyl, aryl, alkaryl, aralkyl, alicyclic and like groups, M is a metal and $n$ is an integer corresponding to the valence of the metal M; and more preferably wherein R and R' are monovalent alkyl hydrocarbon radicals containing 1 to 10 carbon atoms, M is monovalent or divalent metal cation and $n$ is a number from 1 to 2. The amount of catalysts employed may be varied from 0.001 to about one weight percent based on the weight of dialkyl ester of the dicarboxylic acid being employed, and more preferably is varied from about 0.01 to 0.1 weight percent.

It is also contemplated that the catalysts of this invention may be employed in conjunction with other polyesters catalysts which may be effective during either or both steps or stages of the polyesterification reactions.

The ester interchange reaction, when employed, is normally conducted at atmospheric pressure and at a temperature in the range of about 65° C. to about 300° C. depending upon the boiling point of the alcohol to be removed as a result of the ester interchange reaction. In many cases reduced pressures may be employed. In reactions when lower boiling alcohols are to be removed, a temperature from about 150° C. and 225° C. is normally used. This reaction is normally conducted until all the alcohol has been evolved and removed by distillation, and any excess glycol is also removed by distillation. The polymerization reaction is conducted at temperatures in the range of about 200° C. to about 350° C. under reduced pressure from less than about 1 mm. to about 5 mm. of mercury and is normally conducted under nitrogen or other inert gas which is substantially free of oxygen.

The glycols employed in the preparation of the modified polyesters of this invention may be any glycol containing from 2 to 10 carbon atoms, or polyester-forming derivatives thereof, and more preferably are polymethylene glycols of the general formula $HO(CH_2)_nOH$ wherein $n$ is an integer from 2 to 10. Ethylene glycol is found particularly useful in preparing the modified polyesters of this invention. At least about one mol of the glycol per mol of dibasic dicarboxylic acid or esters thereof is employed. Generally, however, high proportions of the glycol relative to the esters or acids are used. For example, up to ten times as many mols of glycol as ester or acid may be employed because the initial interchange reaction takes place more readily in the presence of an excess of glycol.

The dicarboxylic acids, or polyester-forming derivatives thereof, may be any of those employed by those skilled in the art to make polyesters, but more preferably are aromatic dicarboxyilc acids or dialkyl esters thereof for preparing fiber-forming polyesters. Of particular value in preparing such polyesters is terephthalic acid and dialkyl esters thereof such as dimethyl terephthalate and similar dialkyl esters wherein the alkyl groups are the same or different alkyl radicals, preferably alkyl hydrocarbon radicals containing 1 to 5 carbon atoms thereof. Isophthalic acid and its dialkyl esters also may be employed to make the modified polyesters of this invention. Other useful aromatic dicarboxylic acids or esters thereof which may be used include p,p'-dicarboxy diphenyl, naphthalene dicarboxylic acids such as 2,6-dicarboxynaphthalene; p,p'-dicarboxy diphenylsulfone, p,p'-dicarboxyphenoxyethane and the like. Aliphatic dicarboxylic acids such as adipic, succinic, sebacic and the like may be substituted in part or wholly for the aryl dicarboxylic acids. Longer chain aliphatic dicarboxylic acid esters such as dimethyl 1,20-eicosane dioate and the like may be substituted in part for the aryl dicarboxylic acids or esters. Copolyesters also are readily prepared in accordance with the present invention. For example, the copolyesters formed by the reaction of a glycol, as hereinbefore defined, and two or more aromatic dicarboxylic acids or dialkyl esters thereof, or by the reaction of two or more glycols with one or two or more acids or dialkyl esters thereof. Of particular utility is the copolyester formed by the reaction of dimethyl terephthalate, dimethyl isophthalate and ethylene glycol.

The modified linear condensation polyesters, produced in accordance with the present invention, have specific viscosities in the range of about 0.3 to about 0.6, which represent fiber- and filament-forming polymers. It is to be understood, of course, that non-fiber-forming polyesters may be produced by means of the present invention which have a specific viscosity greater or less than 0.3 to 0.6 and such polyesters are useful for example, in the manufacture of coating compositions, lacquers, molding compositions and the like.

Specific viscosity, as employed herein, is represented by the formula $$N_{sp} = N_{Rel.} - 1$$

where $$N_{Rel.} = \frac{\text{Time of flow of the polymer solution in seconds}}{\text{Time of flow of the solvent in seconds}}$$

Viscosity determination on the polymer solutions and solvent are made by allowing said solutions and solvent to flow by gravity at 25° C. through a capillary tube. In all determinations of polymer solution viscosities, a polymer solution containing 0.5 percent by weight of the polymer dissolved in a solvent mixture containing two parts by weight of phenol and one part by weight, of 2,4,6-trichlorophenol, and 0.5 percent by weight of water based on the total weight of the mixture, was employed.

To further illustrate the present invention and the advantages thereof, the following specific examples are given, it being understood that these are merely intended to be illustrative and not limitative. Unless otherwise indicated, all parts and percents are by weight.

*Example I*

A mixture of 58.2 grams of dimethyl terephthalate, 66 ml. of ethylene glycol and 30 mg. of zinc diethyl dithiocarbamate was placed in a reaction vessel, which was fitted with a nitrogen inlet tube and a condenser, and heated for 135 minutes at 175° C. to 180° C. while bubbling nitrogen through the reaction mixture. The methanol formed as a result of the ester interchange reaction was distilled out of the reaction vessel. The reaction mixture was then heated at 285° C. for 30 minutes to remove the excess ethylene glycol by distillation. The resulting bis-2-hydroxyethyl terephthalate was then heated at 285° C. at a reduced pressure of less than 1 mm. of mercury for 3 hours. After this reaction period the polymer melt was water white, highly viscous and readily formed cold-drawable fibers of excellent strength. The specific viscosity of the polyester was 0.371. Samples of this polyester were pressed into disks and color indices based on reflectance measurements were calculated. These polymer disks were found to have a purity index of 96.8, a whiteness value of 75.9 and a brightness value of 75.1.

For comparison purposes, the above experiment was repeated with manganous formate, which is an excellent catalyst for the polyesterification reaction, in place of zinc diethyl dithiocarbamate. The resulting polyester had a whiteness value of only 61.0 and a brightness value of 67.3.

*Example II*

Following the experimental procedure of Example I, a mixture consisting of 58.2 grams of dimethyl terephthalate, 66 ml. of ethylene glycol and 30 mg. of manganese diethyl dithiocarbamate was reacted rapidly to obtain a polyester having a specific viscosity of 0.362. The purity index, whiteness and brightness values of this polymer were substantially the same as those of the polymer of Example I.

*Example III*

Following the experimental procedure of Example I, a mixture of 58.2 grams of dimethyl terephthalate, 66 ml. of ethylene glycol, 30 mg. of manganese diethyl dithiocarbamate and 20 mg. of zinc acetylacetonate was readily reacted under the conditions described in Example I. The resulting polyester had a specific viscosity of 0.360 and excellent color.

*Example IV*

Following the experimental procedure of Example I, a mixture of 58.2 grams of dimethyl terephthalate, 66 ml. of ethylene glycol, 15 mg. of zinc acetylacetonate and 15 mg. of zinc diethyl dithiocarbamate was reacted as described in Example I above. The polymeric polyesters of this example formed melt spinnable, cold-drawable fibers. This polyester had a specific viscosity of 0.349 and had excellent color.

When the above examples are repeated with other esters of aromatic dicarboxylic acids such as diethyl terephthalate and 2,6-dicarbomethoxy naphthalene, mixtures of dimethyl terephthalate and dimethyl isophthalate; with other glycols such as tetramethylene glycol and hexamethylene glycol; with other of the above described catalysts including lithium diethyl dithiocarbamate, zinc dimethyl dithiocarbamate, manganese dimethyl dithiocarbamate, manganese dibutyl dithiocarbamate, and the like, in amounts from about 0.03 to about 0.08 weight percent based on the weight of the dialkyl ester of the aromatic dicarboxylic acid, polyesters are obtained having high molecular weights and specific viscosities, which have excellent whiteness and brightness values, and which are readily melt spun to cold-drawable fibers and filaments.

Likewise, when polyester reactive intermediate such as bis-2-hydroxyethyl terephthalate, regardless of how prepared, is heated under polymerizing conditions in the presence of catalytic amounts, such as 0.03 to 0.08 weight percent of any of the above catalysts, based on the weight of dimethyl terephthalate equivalent to the reactive intermediate, polyesters which are readily formed into cold-drawable fibers and which have excellent whiteness and brightness values are readily formed in reasonable reaction times which are sufficient for large scale production.

The polymers which are produced in accordance with the present invention and shaped articles produced therefrom such as fibers, filaments, yarns, films and the like have improved whiteness values, that is, lack of color, as compared to the polymers and shaped articles produced by prior art procedures. Those skilled in the art will readily recognize the advantages of this improvement in polyesters. In the textile art, in order to dye goods in pastel shades, which at present represents the major dyeing effort in polyesters, a white fiber or yarn is desired. When a yarn is spun from off-color polyesters, off-color shades will result when such yarn or materials made therefrom are dyed. The presence of color in polyester yarns require a bleaching step which increases the cost of textile products and often adversely affects other desirable properties of the product.

The novel process of this invention, i.e. the use of catalytic amounts of metal salts of dithiocarbamic acids in the preparation of polyesters, provides the art with a process employing a readily available catalyst which is soluble in the reaction mixture in usable concentrations, which is an excellent accelerator of the polyesterification reactions, which produces no color in the molten polymer or polyester product, and which produces high molecular weight cold-drawable fiber-forming polyesters with improved color properties. Other advantages of the invention will be apparent to those skilled in the art.

We claim:

1. A process for producing polymeric polyesters comprising conducting a condensation reaction of a glycol containing 2 to 10 carbon atoms with a dialkyl ester of an aromatic dicarboxylic acid wherein the alkyl groups contain 1 to 5 carbon atoms in the presence of a catalytic amount a compound having the formula

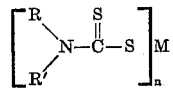

wherein R and R' are selected from the group consisting of hydrogen and alkyl radicals containing 1 to 10 carbon atoms, M is a metal and $n$ is an integer corresponding to the valence of the metal M.

2. A process for producing polyethylene terephthalate which comprises conducting an ester interchange between ethylene glycol and dimethyl terephthalate to form bis-2-hydroxyethyl terephthalate and subsequently polymerizing said bis-2-hydroxyethyl terephthalate, both the ester interchange and polymerization reactions being conducted in the presence of about 0.001 to about one weight percent, based on the weight of said dimethyl terephthalate, of zinc diethyl dithiocarbamate.

3. A process for producing polyethylene terephthalate which comprises conducting an ester interchange between ethylene glycol and dimethyl terephthalate to form bis-2-hydroxyethyl terephthalate and subsequently polymerizing said bis-2-hydroxyethyl terephthalate, both the ester interchange and polymerization reactions being conducted in the presence of about 0.001 to about one weight percent, based on the weight of said dimethyl terephthalate, of manganese diethyl dithiocarbamate.

4. The process of claim 2 wherein the amount of zinc diethyl dithiocarbamate employed is from about 0.01 to about 0.1 weight percent.

5. The process of claim 3 wherein the amount of manganese diethyl dithiocarbamate employed is from about 0.01 to about 0.1 weight percent.

6. A process for producing bis-2-hydroxyethyl terephthalate comprising reacting ethylene glycol and dimethyl terephthalate together in the presence of from about 0.01 to about 0.1 weight percent, based on the weight of said dimethyl terephthalate, of zinc diethyl dithiocarbamate.

7. A process for producing bis-2-hydroxyethyl terephthalate comprising reacting ethylene glycol and dimethyl terephthalate together in the presence of from about 0.01 to about 0.1 weight percent, based on the weight of said dimethyl terephthalate, of manganese diethyl dithiocarbamate.

8. A process for producing polyethylene terephthalate which comprises polymerizing bis-2-hydroxyethyl terephthalate in the presence of a catalytic amount of zinc diethyl dithiocarbamate.

9. A process for producing polyethylene terephthalate which comprises polymerizing bis-2-hydroxyethyl terephthalate in the presence of a catalytic amount of manganese diethyl dithiocarbamate.

10. A process for producing polyethylene terephthalate comprising reacting ethylene glycol and dimethyl terephthalate in the presence of from 0.01 to about 0.1 weight percent, based on the weight of said dimethyl terephthalate, of zinc diethyl dithiocarbamate at atmospheric pressure and at a temperature ranging from about 65° C. to about 300° C. until ester interchange is essentially complete and then continuing the reaction in the presence of said dithiocarbamate compound at a temperature in the range of about 200° C. to about 350° C. under reduced pressure to produce high molecular weight polyethylene terephthalate.

11. A process for producing polyethylene terephthalate comprising reacting ethylene glycol and dimethyl terephthalate in the presence of from about 0.01 to about 0.1 weight percent, based on the weight of said dimethyl terephthalate, of manganese diethyl dithiocarbamate at atmospheric pressure and at a temperature ranging from about 65° C. to about 300° C. until ester interchange is essentially complete and then continuing the reaction in the presence of said dithiocarbamate compound at a temperature in the range of about 200° C. to about 350° C. under reduced pressure to produce high molecular weight polyethylene terephthalate.

References Cited in the file of this patent

FOREIGN PATENTS

| | | |
|---|---|---|
| 753,880 | Great Britain | Aug. 1, 1956 |